United States Patent [19]
Kreitzer

[11] Patent Number: 4,523,816
[45] Date of Patent: Jun. 18, 1985

[54] CATADIOPTRIC LENS
[75] Inventor: Melvyn H. Kreitzer, Cincinnati, Ohio
[73] Assignee: Vivitar Corporation, Santa Monica, Calif.
[21] Appl. No.: 522,519
[22] Filed: Aug. 12, 1983
[51] Int. Cl.³ .............................................. G02B 17/08
[52] U.S. Cl. ...................................... 350/444; 350/442
[58] Field of Search ........................ 350/442, 443, 444
[56] References Cited
U.S. PATENT DOCUMENTS
4,061,420 12/1977 Kaprelian et al. ................... 350/442
4,235,508 11/1980 Kaprelian ............................ 350/505

Primary Examiner—John K. Corbin
Assistant Examiner—Rebecca D. Gass
Attorney, Agent, or Firm—Costas, Montgomery & Dorman

[57] ABSTRACT

A catadioptric lens where the primary and secondary lenses are fixed in relation to the image plane and focusing of the lens is accomplished by movement of a refractive lens group positioned subsequent to the mirror system in relation to the object end of the lens.

9 Claims, 4 Drawing Figures

CATADIOPTRIC LENS

FIELD OF THE INVENTION

This invention relates to catadioptric lenses, and more particularly relates to catadioptric lenses which are focused by movement of internal refractive components.

BACKGROUND OF THE INVENTION

Catadioptric lenses are used to provide extremely long focal lengths while requiring only a relatively short physical length of the lens. Primary and secondary reflective surfaces of mirrors within the lens are utilized to increase the length of the optical path through the lens while decreasing the overall length of the lens and thereby provide a very high telephoto ratio. The telephoto ratio is the ratio of the front vertex distance (FVD) of the lens to its equivalent focal length, the front vertex distance being the dimension from the front vertex of the lens to the film plane.

In catadioptric lenses of the type of which this invention pertains, light entering the housing passes to a primary mirror where it is reflected to a secondary mirror on the object side of the primary mirror, and hence to the refractive portion of the optical system. Most, if not all, catadioptric lenses are focused by relative motion of the primary and secondary mirrors. Optically, this is satisfactory. However, if the lens is to have a large relative aperture, large primary mirrors are required. These mirrors are inherently sensitive in positioning. Movement of the primary mirror requires large, and hence more expensive helicoidal focusing mechanisms.

It would be desirable to seal the main mirror system and achieve focusing by moving smaller refractive elements within the lens. However, this presents a difficult optical problem. Catadioptric systems covering the relatively large angles required for consumer photography, typically four to ten degrees full field angle, necessarily need rear refractive corrective elements to compensate for the inherent field curvature of the main mirror system.

SUMMARY OF THE INVENTION

The present invention provides catadioptric lenses where refractive elements internal to the lens are moved axially for focusing, and also provides stability of aberration corrections as these elements are moved.

The invention as hereinafter explained may be embodied in either a Cassegrain or Mangin type catadioptric lens. In either case, the first refractive lens group is a positive group of relatively week optical power, and the second or moving refractive group is preferably a three component negative group of strong power, the first and last components may be singlets or doublets while the middle component in all examples is a doublet. This method of focusing also permits the design of relatively fast lenses, for example, an aperture of F/4.5 for an equivalent focal length (EFL) close to 450 mm.

An object of this invention is to provide new and improved catadioptric lenses.

Another object of the invention is to provide a catadioptric lens design wherein refractive groups other than a mirror are moved to accomplish focusing.

A further object of this invention is to provide a new and improved catadioptric lens which may utilize a relatively large primary mirror which is not required to move for focusing to thereby achieve a fast relative aperture and long focal length in a compact lens.

The features of the invention which are believed to be novel are particularly pointed out and distinctly claimed in the concluding portion of this specification. The invention, however, together with further objects and advantages thereof, may best be appreciated by reference to the following detailed description taken in conjunction with the drawings.

DETAILED DESCRIPTION OF THE ILLUSTRATED EMBODIMENTS

Throughout the drawings and description, refractory lens elements will be indicated by the letter "L" followed by an Arabic number. Groups of lens elements will be identified by the letter "G" followed by an Arabic numeral. Refractive surfaces of various elements will be identified by the letter "S" followed by an Arabic numeral, and mirror surfaces which have no refractive value are designated "M" followed by an Arabic numeral.

Figure 1:
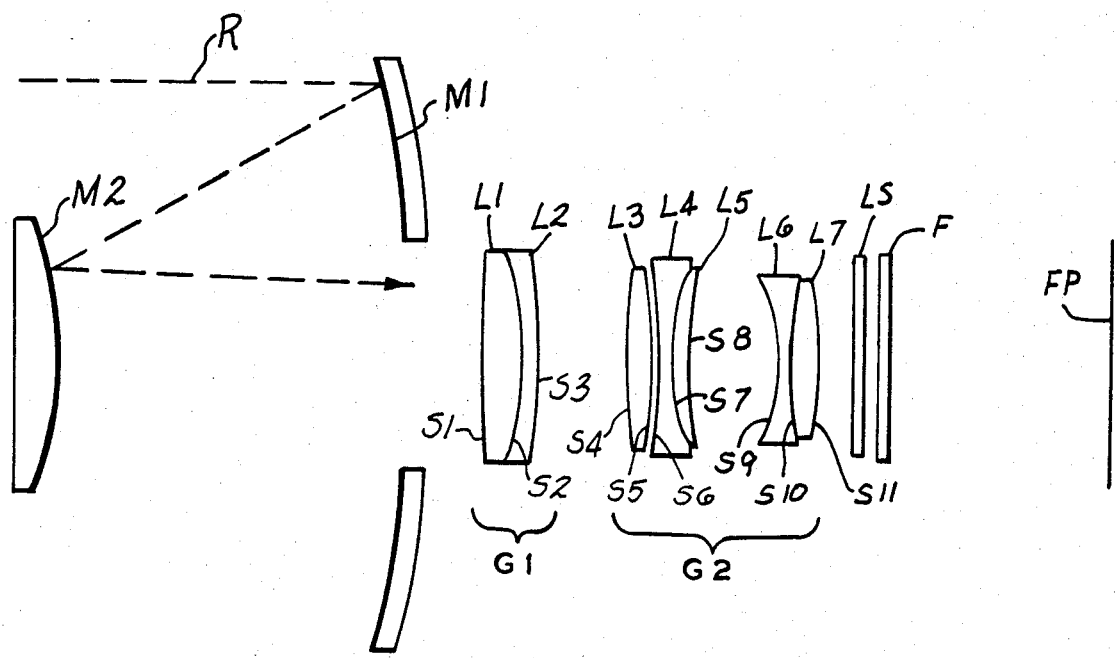
FIGS. 1–4 are schematic side elevations of lenses embodying the invention.

FIG. 1 exemplifies the invention embodied in a Cassegrain type catadioptric lens. The lens of FIG. 1 comprises a first or primary mirror having a reflective surface M1, and a secondary mirror having a reflective surface M2. As shown, a light ray R striking mirror surface M1 is reflected by mirror surface M1 to surface M2 and then re-reflected to refractive elements comprising a stationary positive group G1 and a movable negative group G2. Group G1 comprises lens elements L1 and L2 in the form of a cemented positive doublet having surfaces S1, S2, and S3. Group G2 comprises a positive biconvex singlet L3 having surfaces S4 and S5; a doublet comprising a biconcave element L4, and a positive meniscus L5 having surfaces S6-S8; and a doublet comprising a biconcave element L6 and a biconvex element L7 having surfaces S9-S11. Group G2 is followed by two plano elements LS and F. Elements LS and F are not optically required. Element LS is a seal or protective member, and element F represents a filter. The image plane is indicated by the reference FP. A lens according to FIG. 1 would further include a double plano sealing element on the object side of mirror M2. Group G2 is movable for focusing.

The lens of FIG. 1 is substantially described in Table I where $N_d$ is the index of refraction of each refractive element and $V_d$ is the dispersion of each element as expressed by its Abbe number. Positive radii which are struck on the axis of the lens to the right of the surface, while negative radii are struck on the axis of the lens to the left of the surface. All axial distances between the surfaces are set forth from the object end to the image end. The distance from the axial center of reflective surface M1 and surface M2 is shown as negative.

Figure 2:
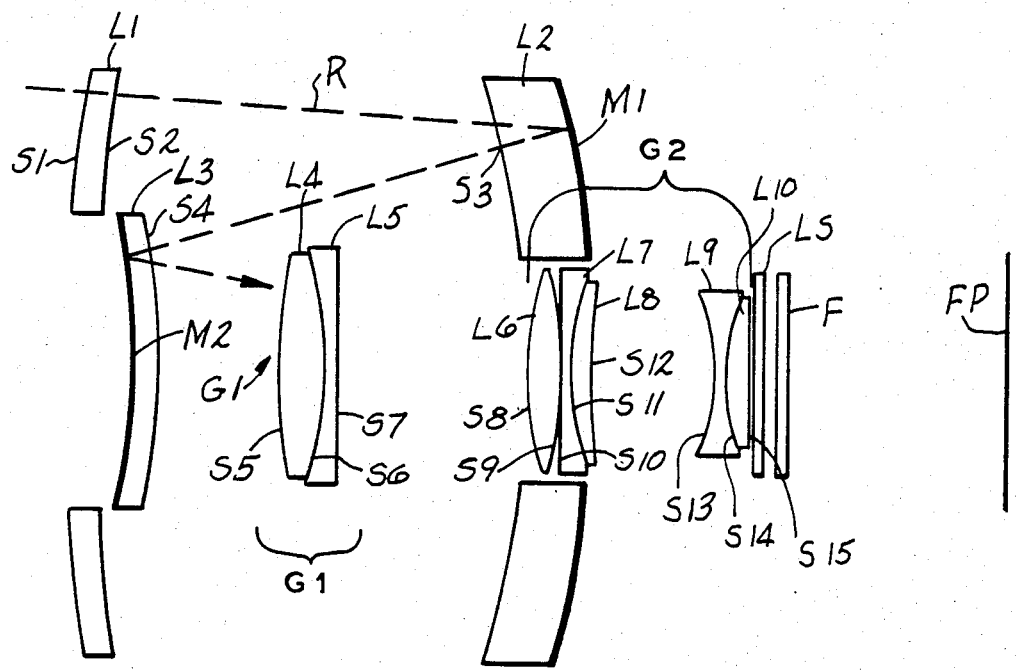

FIG. 2 exemplifies a catadioptric lens of the Mangin Type where both the primary mirror and the secondary mirror are formed on refractive elements.

The lens comprises a first corrector element L1, having surfaces S1 and S2; a second refractive element L2 having a surface S3 and a reflective surface M1 on the image side thereof; a refractive element L3 having a surface S4 and reflective surface M2 on the object side thereof; a fixed positive group G1 comprising a doublet consisting of a biconvex element L4 and a negative meniscus L5; Group G1 has surfaces S5-S7 as shown. Group G1 is followed by a negative group G2 which comprises a biconvex singlet L6, a doublet consisting of biconcave element L7 and positive meniscus L8 followed by a doublet comprising a biconcave element L9 and a positive meniscus L10, then two plano elements LS and F. The lens elements L6-L10 have surfaces S8-S15, as shown. The group G2 comprising the elements L6-L10 are axially movable to focus the lens. Element LS is merely a sealing unit and element F is a removable filter. A lens as shown in FIG. 2 is substantially described in Table II using the same nomenclature as in Table I.

Figure 3:
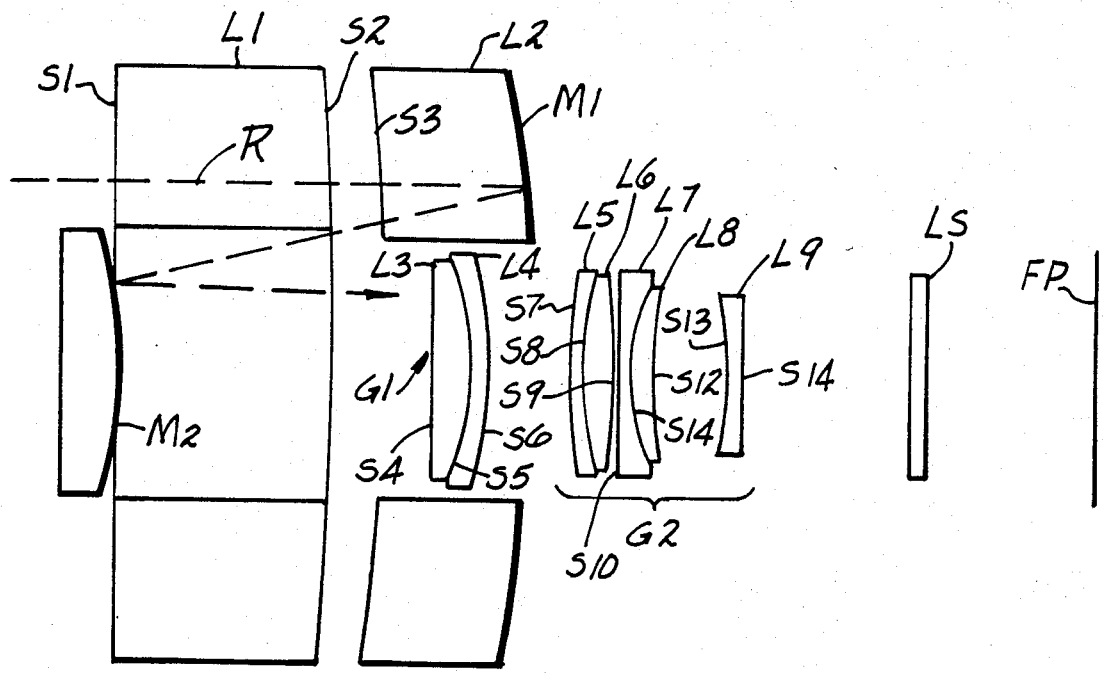

FIG. 3 exemplifies a Mangin type catadioptric lens embodying the invention which utilizes a corrector L1 having aspheric surface S1 and S2. The corrector L1 is positioned behind a double plano sealing element on the object side (now shown). Light entering from the object side through the corrector element L1 is reflected by a primary mirror surface to the image side surface of a secondary mirror M2 and hence to a fixed positive group G1. Group G1 comprises a positive doublet which consists of a biconvex element L3 and a negative meniscus L4 having surfaces S4-S6. Group G1 is followed by a movable focusing group G2 which comprises a first doublet consisting of a negative meniscus L5 and a biconvex element L6; a second doublet consisting of a negative meniscus L7 and a positive meniscus L8; and a negative meniscus L9 followed by a double plano sealing element LS.

Surface S1 and S2 of element L1 are aspheric and is defined by the following equation:

$$X = \frac{Cy^2}{1 + [1 - (1 + k)c^2y^2]^{\frac{1}{2}}} + Dy^4 + Ey^6 + Fy^8 + Gy^{10}$$

where
 X is the surface sag at a semi-aperture distance y from the axis of the lens;
 C is the curvature of a lens surface at the optical axis equal to the reciprocal of the radius at the optical axis,
 K is a constant, and
 D, E, F, and G are coefficients A lens as shown in FIG. 3 is substantially described in Table III using the same nomanclature as in Tables I and II.

Figure 4:
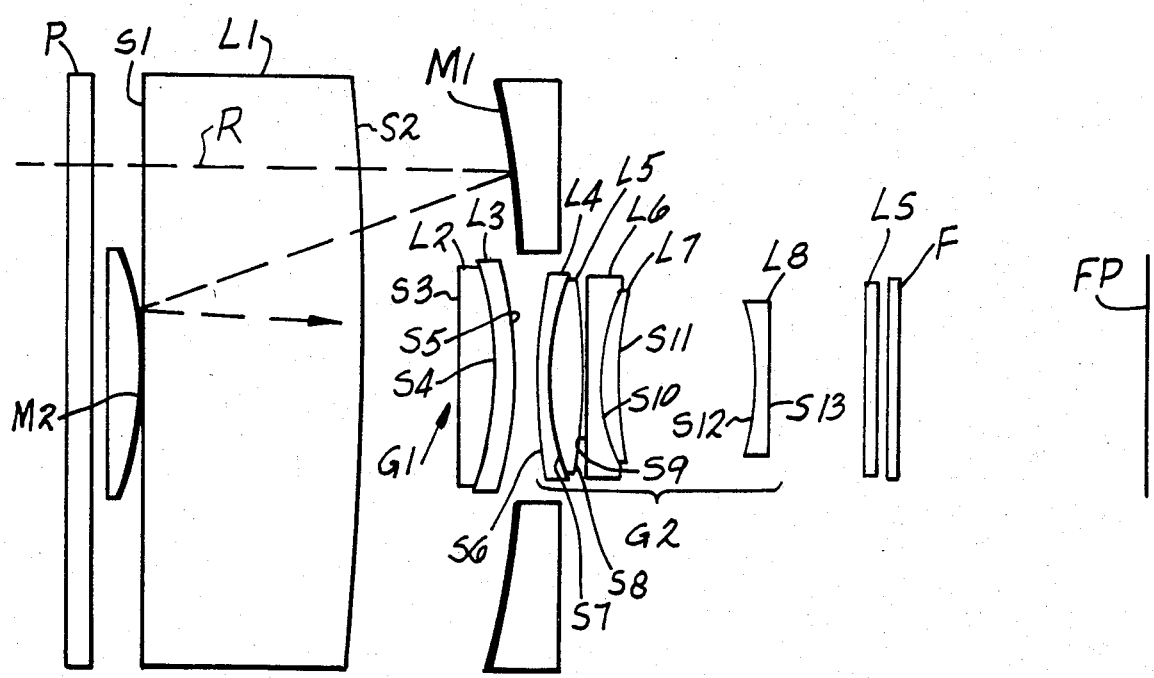

FIG. 4 exemplifies another catadioptric lens embodying the invention which also uses a corrector having an aspheric surface defined by the foregoing equation. This lens is of the Cassegrain type and comprises from the object end a protective element P having plano surfaces a corrector element L1 having surfaces S1 and S2, a primary mirror M1, and a secondary mirror M2. The lens further comprises a stationary positive group G1 comprising a doublet consisting of a positive element L2, and a negative meniscus L3 having surfaces S3-S5. Group G1 is followed by an axial movable negative group G2 which comprises a positive doublet L4, L5; a negative doublet L6, L7, and a biconcave singlet L8. Group G2 is followed by a bi-plano sealing element LS and a removable filter F. Group G2 has surfaces S7-S13.

A lens as shown in FIG. 4 is substantially defined in Table IV, using the same nomenclature as used in Tables I-III.

The internal focusing of the refractory elements of groups G1 and G2 will produce some variation in EFL as the lens is focused as shown in the prescription tables. This is due to the movement of negative group G2 to achieve satisfactory performance between a range of magnifications of zero (infinity) to approximately minus one hundred twenty-five thousandths (0.125) at about three meters.

The relative optical powers of $K_1$ and $K_2$ of groups G1 and G2 respectively should have a relationship of $$3.5 > |K_2/K_1| > 1.8$$

where the optical power of the groups are expressed as the reciprocal of the EFL of the group in millimeters. This will provide the necessary optical correction, while permitting movement of negative group II for focusing.

In all of the following tables, the lenses are set forth as sealed to an image frame of 24×36 mm.

TABLE I

| ELEMENT | | SURFACE RADIUS (MM) | AXIAL DISTANCE BETWEEN SURFACES (MM) | $N_D$ | $V_D$ |
|---|---|---|---|---|---|
| mirror body | M1 | −235.42 | −60.83 | Reflective | |
| mirror body | M2 | −163.995 | 59.66 | Reflective | |
| L1 | S1 | 180.151 | 7.60 | 1.517 | 64.2 |
| | S2 | −35.596 | | | |
| L2 | | | 2.54 | 1.648 | 33.8 |
| | S3 | −70.640 | 15.54 | | |
| | S4 | 113.479 | | | |
| L3 | | | 5.00 | 1.847 | 23.8 |
| | S5 | −143.114 | .10 | | |
| | S6 | −786.272 | | | |
| L4 | | | 2.43 | 1.834 | 37.3 |
| | S7 | 30.664 | | | |
| L5 | | | 3.87 | 1.501 | 58.6 |
| | S8 | 79.859 | 19.322 | | |
| | S9 | −33.498 | | | |
| L6 | | | 2.12 | 1.487 | 55.4 |
| | S10 | 199.250 | | | |
| L7 | | | 3.00 | 1.648 | 33.8 |
| | S11 | −325.400 | | | |

Relative Aperture = 1/6.0
EFL = 437.1 mm-281.6 mm

TABLE II

| ELEMENT | | SURFACE RADIUS (MM) | AXIAL DISTANCE BETWEEN SURFACES (MM) | $N_D$ | $V_D$ |
|---|---|---|---|---|---|
| L1 | S1 | 251.16 | 8.00 | 1.517 | 52.2 |
| | S2 | 708.47 | 72.00 | | |
| L2 | S3 | −146.41 | 10.13 | 1.517 | 64.2 |
| | M1 | −248.91 | −73.14 | Reflective | |
| L3 | S4 | −119.10 | −5.07 | 1.517 | 52.2 |
| | M2 | −183.44 | 25.07 | Reflective | |
| | S5 | 198.63 | | | |
| L4 | | | 7.98 | 1.517 | 52.2 |
| | S6 | −60.22 | | | |
| L5 | | | 2.66 | 1.673 | 32.2 |
| | S7 | −166.09 | 33.30 | | |
| | S8 | 95.93 | | | |
| L6 | | | 3.50 | 1.741 | 27.8 |

TABLE II-continued

| ELEMENT | SURFACE | RADIUS (MM) | AXIAL DISTANCE BETWEEN SURFACES (MM) | $N_D$ | $V_D$ |
|---|---|---|---|---|---|
|  | S9 | −158.82 |  |  |  |
|  |  |  | 0.72 |  |  |
|  | S10 | −1125.26 |  |  |  |
| L7 |  |  | 2.20 | 1.834 | 37.3 |
|  | S11 | 40.32 |  |  |  |
| L8 |  |  | 3.50 | 1.487 | 70.4 |
|  | S12 | 142.91 |  |  |  |
|  |  |  | 19.55 |  |  |
|  | S13 | −44.18 |  |  |  |
| L9 |  |  | 1.92 | 1.650 | 39.9 |
|  | S14 | 39.27 |  |  |  |
| L10 |  |  | 3.80 | 1.805 | 25.5 |
|  | S15 | −6824.24 |  |  |  |

Relative Aperture = 1/4.65
EFL = 436.6 mm−260.9 mm

TABLE III

| ELEMENT | SURFACE | RADIUS (MM) | AXIAL DISTANCE BETWEEN SURFACES (MM) | $N_D$ | $V_D$ |
|---|---|---|---|---|---|
|  | S1 | 856.98 |  |  |  |
| L1 |  |  | 40.00 | 1.491 | 57.1 |
|  | S2 | −266.81 |  |  |  |
|  |  |  | 9.10 |  |  |
|  | S3 | −167.53 |  |  |  |
| L2 |  |  | 25.62 | 1.491 | 57.1 |
|  | M1 | −242.65 |  | Reflective |  |
|  |  |  | 73.17 |  |  |
|  | M2 | −152.58 |  | Reflective |  |
|  |  |  | 55.45 |  |  |
|  | S4 | 374.06 |  |  |  |
| L3 |  |  | 5.60 | 1.517 | 64.2 |
|  | S5 | −40.50 |  |  |  |
| L4 |  |  | 2.21 | 1.620 | 36.3 |
|  | S6 | −86.61 |  |  |  |
|  |  |  | 23.16 |  |  |
|  | S7 | 160.91 |  |  |  |
| L5 |  |  | 2.21 | 1.776 | 49.4 |
|  | S8 | 52.65 |  |  |  |
| L6 |  |  | 5.70 | 1.740 | 28.2 |
|  | S9 | −125.17 |  |  |  |
|  |  |  | 0.75 |  |  |
|  | S10 | −1399.06 |  |  |  |
| L7 |  |  | 2.21 | 1.806 | 40.7 |
|  | S11 | 33.15 |  |  |  |
| L8 |  |  | 4.60 | 1.517 | 64.2 |
|  | S12 | 181.78 |  |  |  |
|  |  |  | 13.74 |  |  |
|  | S13 | −42.28 |  |  |  |
| L9 |  |  | 2.00 | 1.766 | 49.4 |
|  | S14 | −178.63 |  |  |  |

Aspheric Surface: S1
S1
K 0.010
D 0.5892 × 10⁻⁹
E 0.1893 × 10⁻¹¹
F 0.7951 × 10⁻¹⁵
G 0.1502 × 10⁻¹⁸
EFL = 436.2−263.5 mm

TABLE IV

| ELEMENT | SURFACE | RADIUS (MM) | AXIAL DISTANCE BETWEEN SURFACES (MM) | $N_D$ | $V_D$ |
|---|---|---|---|---|---|
|  | S1 | ∞ |  |  |  |
| L1 |  |  | 36.75 | 1.491 | 57.2 |
|  | S2 | −1107.79 |  |  |  |
|  |  |  | 27.30 |  |  |
|  | M1 | −217.43 |  | Reflective |  |
|  |  |  | −64.55 |  |  |
|  | M2 | −143.54 |  | Reflective |  |
|  |  |  | 53.50 |  |  |
|  | S3 | 634.30 |  |  |  |
| L2 |  |  | 6.88 | 1.517 | 64.2 |
|  | S4 | −50.64 |  |  |  |
| L3 |  |  | 2.30 | 1.673 | 32.2 |
|  | S5 | −87.29 |  |  |  |
|  |  |  | 4.25 |  |  |
|  | S6 | 116.03 |  |  |  |
| L4 |  |  | 2.20 | 1.720 | 50.3 |
|  | S7 | 50.04 |  |  |  |
| L5 |  |  | 5.17 | 1.728 | 26.1 |
|  | S8 | −204.60 |  |  |  |
|  |  |  | 0.72 |  |  |
|  | S9 | −800.99 |  |  |  |
| L6 |  |  | 2.20 | 1.834 | 37.3 |
|  | S10 | 31.89 |  |  |  |
| L7 |  |  | 3.50 | 1.517 | 64.2 |
|  | S11 | 96.80 |  |  |  |
|  |  |  | 23.08 |  |  |
|  | S12 | −44.48 |  |  |  |
| L8 |  |  | 1.92 | 1.720 | 50.3 |
|  | S13 | −286.84 |  |  |  |

Aspheric Surface S1
K .010
D −289 × 10⁻⁷
E .365 × 10⁻¹²
F −.579 × 10⁻¹⁵
G .913 × 10⁻¹⁹
EFL = 437.4 mm The relationship of the powers ($K_1$ and $K_2$) of groups G1 and G2, respectively is set forth in Table V below:

TABLE V

|  | Power of Group G1 ($K_1$) | Power of Group G2 ($K_2$) | $|K_2/K_1|$ |
|---|---|---|---|
| Table I | .00829 | −.0163 | 1.966 |
| Table II | .00406 | −.0134 | 3.300 |
| Table III | .00598 | −.0153 | 2.559 |
| Table IV | .00545 | −.0186 | 3.413 |

The foregoing technique of focusing catadioptric lens permits the design of fast lens systems for a given EFL, while using relatively large primary mirrors that are inherently sensitive from the standpoint of positioning, and which would otherwise require expensive helicoidal focusing mechanisms if the mirror had to be moved for focusing. With the internal focusing disclosed herein, the overall lens may be sealed at its front and rear ends against moisture and dust.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A catadioptric lens having object and image sides comprising a first component having a first reflective surface with a central aperture therethrough, a second component having a reflective surface disposed on the object side of said first component, said second component arranged to reflect light to refractive lens groups on the image side of said second component, said first and second components being arranged in fixed relationship, a first lens group of positive power disposed to the image side of said second component, and a second refractive lens group of negative power disposed on the image side of said first refractive group, said second refractive group being axially movable to focus said lens.

2. The lens of claim 1 where the absolute optical power of said second negative refractive group is greater than the power of said first positive refractive group.

3. The lens of claim 2 where the absolute optical power of said second negative refractive group is substantially twice or greater than the optical power of said first refractive group.

4. The lens of claim 1 where the ratio of the absolute optical powers of said first and second refractive groups are $$3.5 > |K2/K1| > 1.8$$

where $K_2$ is the optical power of the second refractive group and $K_1$ is the optical power of the first refractive group.

5. A lens according to claim 1 having aspheric surfaces defined by the equation:

$$X = \frac{Cy^2}{1 + [1 - (1 + k)c^2y^2]^{\frac{1}{2}}} + Dy^4 + Ey^6 + Fy^8 + Gy^{10}$$

where
X is the surface sag at a semi-aperture distance y from the axis of the lens;
C is the curvature of a lens surface at the optical axis equal to the reciprocal of the radius at the optical axis,
K is a constant, and D, E, F, and G are coefficients.

6. A lens according to claim 1 scaled to an image frame of 24×36 mm substantially as described below:

| ELEMENT | | SURFACE RADIUS (MM) | AXIAL DISTANCE BETWEEN SURFACES (MM) | $N_D$ | $V_D$ |
|---|---|---|---|---|---|
| mirror body | M1 | −235.42 | | Reflective | |
| | | | −60.83 | | |
| mirror body | M2 | −163.995 | | Reflective | |
| | | | 59.66 | | |
| L1 | S1 | 180.151 | | | |
| | | | 7.60 | 1.517 | 64.2 |
| | S2 | −35.596 | | | |
| L2 | | | 2.54 | 1.648 | 33.8 |
| | S3 | −70.640 | | | |
| | | | 15.54 | | |
| | S4 | 113.479 | | | |
| L3 | | | 5.00 | 1.847 | 23.8 |
| | S5 | −143.114 | | | |
| | | | .10 | | |
| | S6 | −786.272 | | | |
| L4 | | | 2.43 | 1.834 | 37.3 |
| | S7 | 30.664 | | | |
| L5 | | | 3.87 | 1.501 | 58.6 |
| | S8 | 79.859 | | | |
| | | | 19.322 | | |
| | S9 | −33.498 | | | |
| L6 | | | 2.12 | 1.487 | 55.4 |
| | S10 | 199.250 | | | |
| L7 | | | 3.00 | 1.648 | 33.8 |
| | S11 | −325.400 | | | |

Relative Aperture=1/6.0
EFL=437.1 mm−281.6 mm
where L1-L7 designates lens elements having surfaces S1-S11, $N_D$ is the index of refraction, and $V_D$ is the dispersion of the lens elements as measured by their Abbe Number.

7. A lens according to claim 1 scaled to an image frame of 24×36 mm substantially as described below:

| ELEMENT | | SURFACE RADIUS (MM) | AXIAL DISTANCE BETWEEN SURFACES (MM) | $N_D$ | $V_D$ |
|---|---|---|---|---|---|
| L1 | S1 | 251.16 | | | |
| | | | 8.00 | 1.517 | 52.2 |
| | S2 | 708.47 | | | |
| | | | 72.00 | | |
| | S3 | −146.41 | | | |
| L2 | | | 10.13 | 1.517 | 64.2 |
| | M1 | −248.91 | | Reflective | |
| | | | −73.14 | | |
| | S4 | −119.10 | | | |
| L3 | | | −5.07 | 1.517 | 52.2 |
| | M2 | −183.44 | | Reflective | |
| | | | 25.07 | | |
| | S5 | 198.63 | | | |
| L4 | | | 7.98 | 1.517 | 52.2 |
| | S6 | −60.22 | | | |
| L5 | | | 2.66 | 1.673 | 32.2 |
| | S7 | −166.09 | | | |
| | | | 33.30 | | |
| | S8 | 95.93 | | | |
| L6 | | | 3.50 | 1.741 | 27.8 |
| | S9 | −158.82 | | | |
| | | | 0.72 | | |
| | S10 | −1125.26 | | | |
| L7 | | | 2.20 | 1.834 | 37.3 |
| | S11 | 40.32 | | | |
| L8 | | | 3.50 | 1.487 | 70.4 |
| | S12 | 142.91 | | | |
| | | | 19.55 | | |
| | S13 | −44.18 | | | |
| L9 | | | 1.92 | 1.650 | 39.9 |
| | S14 | 39.27 | | | |
| L10 | | | 3.80 | 1.805 | 25.5 |
| | S15 | −6824.24 | | | |

Relative Aperture=1/4.65
EFL=436.6 mm−260.9 mm
where L1-L10 designates lens elements having surfaces S1-S15, $N_D$ is the index of refraction, and $V_D$ is the dispersion of the lens elements as measured by their Abbe Number.

8. A lens according to claim 5 scaled to an image frame of 24×36 mm substantially as described below:

| ELEMENT | | SURFACE RADIUS (MM) | AXIAL DISTANCE BETWEEN SURFACES (MM) | $N_D$ | $V_D$ |
|---|---|---|---|---|---|
| L1 | S1 | 856.98 | | | |
| | | | 40.00 | 1.491 | 57.1 |
| | S2 | −266.81 | | | |
| | | | 9.10 | | |
| | S3 | −167.53 | | | |
| L2 | | | 25.62 | 1.491 | 57.1 |
| | M1 | −242.65 | | Reflective | |
| | | | 73.17 | | |
| | M2 | −152.58 | | Reflective | |
| | | | 55.45 | | |
| | S4 | 374.06 | | | |
| L3 | | | 5.60 | 1.517 | 64.2 |
| | S5 | −40.50 | | | |
| L4 | | | 2.21 | 1.620 | 36.3 |
| | S6 | −86.61 | | | |
| | | | 23.16 | | |

-continued

| ELEMENT | SURFACE | SURFACE RADIUS (MM) | AXIAL DISTANCE BETWEEN SURFACES (MM) | $N_D$ | $V_D$ |
|---|---|---|---|---|---|
| | S7 | 160.91 | | | |
| L5 | | | 2.21 | 1.776 | 49.4 |
| | S8 | 52.65 | | | |
| L6 | | | 5.70 | 1.740 | 28.2 |
| | S9 | −125.17 | | | |
| | | | 0.75 | | |
| | S10 | −1399.06 | | | |
| L7 | | | 2.21 | 1.806 | 40.7 |
| | S11 | 33.15 | | | |
| L8 | | | 4.60 | 1.517 | 64.2 |
| | S12 | 181.78 | | | |
| | | | 13.74 | | |
| | S13 | −42.28 | | | |
| L9 | | | 2.00 | 1.766 | 49.4 |
| | S14 | −178.63 | | | |

Aspheric Surface: S1

| S1 |
|---|
| K 0.010 |
| D $0.5892 \times 10^{-9}$ |
| E $0.1893 \times 10^{-11}$ |
| F $0.7951 \times 10^{-15}$ |
| G $0.1502 \times 10^{-18}$ |

EFL=436.2 mm−263.5 mm
where L1-L9 designates lens elements having surfaces S1-S14, $N_D$ is the index of refraction, $V_D$ is the dispersion of the lens elements as measured by their Abbe numbers.

9. A lens according to claim 5 scaled to an image frame of 24×36 mm substantially as described below:

| ELEMENT | SURFACE | SURFACE RADIUS (MM) | AXIAL DISTANCE BETWEEN SURFACES (MM) | $N_D$ | $V_D$ |
|---|---|---|---|---|---|
| L1 | S1 | ∞ | | | |
| | | | 36.75 | 1.491 | 57.2 |
| | S2 | −1107.79 | | | |
| | | | 27.30 | | |
| | M1 | −217.43 | | Reflective | |
| | | | −64.55 | | |
| | M2 | −143.54 | | Reflective | |
| | | | 53.50 | | |
| | S3 | 634.30 | | | |
| L2 | | | 6.88 | 1.517 | 64.2 |
| | S4 | −50.64 | | | |
| L3 | | | 2.30 | 1.673 | 32.2 |
| | S5 | −87.29 | | | |
| | | | 4.25 | | |
| | S6 | 116.03 | | | |
| L4 | | | 2.20 | 1.720 | 50.3 |
| | S7 | 50.04 | | | |
| L5 | | | 5.17 | 1.728 | 26.1 |
| | S8 | −204.60 | | | |
| | | | 0.72 | | |
| | S9 | −800.99 | | | |
| L6 | | | 2.20 | 1.834 | 37.3 |
| | S10 | 31.89 | | | |
| L7 | | | 3.50 | 1.517 | 64.2 |
| | S11 | 96.80 | | | |
| | | | 23.08 | | |
| | S12 | −44.48 | | | |
| L8 | | | 1.92 | 1.720 | 50.3 |
| | S13 | −286.84 | | | |

| Aspheric Surface S1 |
|---|
| K .010 |
| D $-.289 \times 10^{-7}$ |
| E $.365 \times 10^{-12}$ |
| F $-.579 \times 10^{-15}$ |
| G $.913 \times 10^{-19}$ |

EFL=437.4 mm
where L1-L8 designates lens elements having surfaces S1-S13, $N_D$ is the index of refraction, $V_D$ is the dispersion of the lens elements as measured by their Abbe numbers.

* * * * *